United States Patent [19] [11] 4,453,252
Arisawa et al. [45] Jun. 5, 1984

[54] DYE LASER

[75] Inventors: Takashi Arisawa; Yoichiro Maruyama, both of Ibaraki; Seiichi Imahori, Kanagawa; Masaharu Kaneko; Hitohsi Ono, both of Kanagawa, all of Japan

[73] Assignees: Mitsubishi Chemical Industries Limited; Japan Atomic Energy Research Institute, both of Tokyo, Japan

[21] Appl. No.: 368,471

[22] Filed: Apr. 14, 1982

[30] Foreign Application Priority Data

Apr. 14, 1981 [JP] Japan .................................. 56-56067

[51] Int. Cl.³ .............................................. H01S 3/20
[52] U.S. Cl. ...................................... 372/53; 372/51; 372/54
[58] Field of Search ...................... 372/53, 51; 378/54, 378/39

Primary Examiner—William L. Sikes
Assistant Examiner—Leon Scott, Jr.
Attorney, Agent, or Firm—Sughrue, Mion, Zinn, Macpeak, and Seas

[57] ABSTRACT

A dye laser comprising a container retaining a dye solution for laser and an energy source for pumping connected to the container, the dye solution containing a pyrazoloazaxanthenoisoquinolinone dye.

1 Claim, 2 Drawing Figures

DYE LASER

FIELD OF THE INVENTION

This invention relates to a dye laser comprising a container retaining a dye solution for laser and an energy source for pumping connected to said container. More particularly, it relates to a dye laser which contains a pyrazoloazaxanthenoisoquinolinone dye as a laser active dye and generates a laser beam having oscillation wavelength of 550 to 660 nm.

BACKGROUND OF THE INVENTION

The laser is a device which amplifies light and enables to generate a coherent monochromatic light having high intensity and excellent directionality. The dye laser is a liquid laser and is mainly constituted by an optical resonator comprising a transparent container retaining a solution of laser active dye and an energy source for pumping which is optically connected to the container. Usually, the dye solution is forcibly circulated during operation of laser for avoiding optical ununiformity of the solution.

As the energy source for pumping the dye laser, there are energy sources which generate high energy light, such as a discharge tube, a flash lamp, a gas laser (e.g., nitrogen laser, argon laser, etc.), a solid laser (e.g., Nd-YAG laser), and the like.

The dye molecules in the dye laser are excited to a high energy state by pumping, and in turn cause radiative transition. Of the thus generated lights, those which travel along the axis of the resonator are enclosed within the resonator for an enough long time to cause strong interaction with excited dye molecules. When the number of excited molecules exceeds the number of molecules in ground state, stimulated emission takes place. Thus, light is amplified in the resonator to generate laser light.

In comparison with solid lasers or gas lasers, dye lasers have the advantage that they have a large tunability of output wavelength. That is, since laser active dyes have some width as to fluorescence band, they permit to accurately tune output wavelength by using, for example, a prism or a diffraction grating.

SUMMARY OF THE INVENTION

An object of this invention is to provide a dye laser which contains as a laser active dye a novel pyrazoloazaxanthenoisoquinolinone dye providing high conversion efficiency and having an oscillation range of 550 to 660 nm represented by the following formula (I):

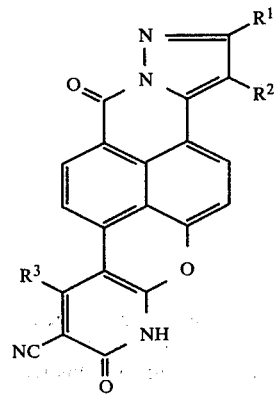

(I)

or

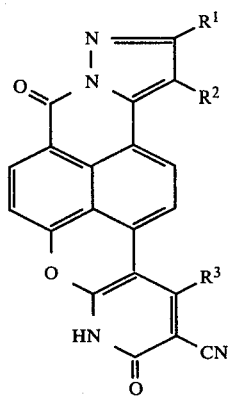

wherein $R^1$ represents a hydrogen atom, an alkyl group, a trifluoromethyl group, an alkoxycarbonyl group, an alkoxycarbonylalkyl group, an aralkyl group or a phenyl group, $R^2$ represents an optionally substituted alkoxycarbonyl group, a cyclohexyloxycarbonyl group, a tetrahydrofurfuryloxycarbonyl group, an aryloxycarbonyl group, a benzyloxycarbonyl group, an acyl group, a cyano group or an optionally substituted carbamoyl group, and $R^3$ represents a lower alkyl group.

DETAILED DESCRIPTION OF THE INVENTION

Figure 1:
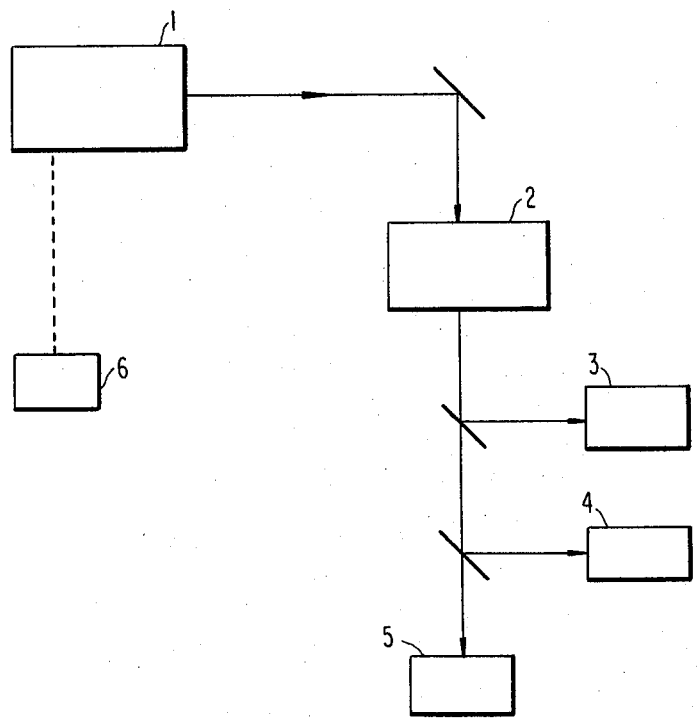
FIG. 1 is a schematic view showing one embodiment of the dye laser of the present invention, wherein numeral 1 designates an Nd-YAG laser, 2 a dye laser, 3 a monochrometer, 4 an oscilloscope, 5 a power meter, and 6 a YAG-output monitor.

Pyrazoloazaxanthenoisoquinolinone dyes used in the dye laser of the present invention are described in more detail below. In the formula (I), the substituent represented by $R^1$ includes, for example, a hydrogen atom; an alkyl group such as a methyl group, an ethyl group, a propyl group, a butyl group, a hexyl group, or an octyl group; a trifluoromethyl group; an alkoxycarbonyl group such as a methoxycarbonyl group, an ethoxycarbonyl group, a propoxycarbonyl group or a butoxycarbonyl group; an alkoxycarbonylalkyl group such as a methoxycarbonylmethyl group, an ethoxycarbonylmethyl group, a propoxycarbonylmethyl group or a butoxycarbonylmethyl group; a phenyl group; and an aralkyl group such as a benzyl group or a phenethyl group, the substituent represented by $R^2$ includes an alkoxycarbonyl group such as a methoxycarbonyl group, an ethoxycarbonyl group, a propoxycarbonyl group, a butoxycarbonyl group, a hexyloxycarbonyl group, or an octyloxycarbonyl group; an alkoxycarbonyl group substituted by an alkoxy group, an alkoxyalkoxy group, an alkylamino group or the like, such as a methoxyethoxycarbonyl group, an ethoxyethoxycarbonyl group, a propoxyethoxycarbonyl group, a butoxyethoxycarbonyl group, a methoxypropoxycarbonyl group, a methoxyethoxyethoxycarbonyl group, an ethoxyethoxyethoxycarbonyl group, a propoxyethoxyethoxycarbonyl group, a butoxyethoxyethoxycarbonyl group, a dimethylaminoethoxycarbonyl group, or a diethylaminoethoxycarbonyl group; a cyclohexyloxycarbonyl group; a tetrahydrofurfuryloxycarbonyl group; a benzyloxycarbonyl group; an aryloxycarbonyl group such as a tolyloxycarbonyl group or a phenoxycarbonyl group; an acyl group such as an acetyl group, a benzoyl group or a thienoyl group; a cyano group; a carbamoyl group; a substituted carbamoyl group such as a phenylcarbamoyl group, a methylcarbamoyl group, an ethylcarbamoyl group, a propylcarbamoyl group, a butylcarbamoyl group, a dimethylcarbamoyl group, a diethylcarbamoyl group or a morpholinocarbamoyl group, and the substituent represented by $R^3$ includes a methyl group, an ethyl group, and a straight or branched chain propyl or butyl group.

The pyrazoloazaxanthenoisoquinolinone dyes represented by the formula (I) are prepared, for example, by reacting a dihalogenobenzopyrazoloisoquinoline represented by the formula (II):

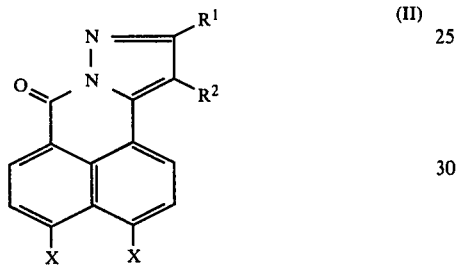

wherein $R^1$ and $R^2$ are the same as defined in the formula (I), and X represents a halogen atom, with a pyridone represented by the formula (III):

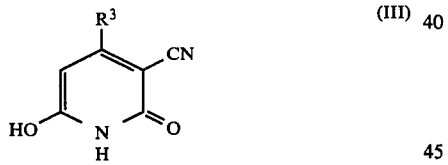

wherein $R^3$ is the same as defined in the formula (I), at 100° to 200° C., preferably 140° to 160° C., in an inert organic solvent such as N-methyl-2-pyrrolidone, N,N-dimethylformamide or quinoline and, if desired, in the presence of an acid-binding agent such as sodium carbonate, potassium carbonate or triethylamine.

The reaction product can be easily isolated as crystals by, in some cases, diluting with methanol, water or the like.

In the dye laser of the present invention, concentration of the pyrazoloazaxanthenoisoquinolinone dye represented by the formula (I) in the dye solution is adjusted to $10^{-1}$ to $10^{-5}$ mol/l. As a solvent for the dye solution, water and various organic solvents are used. Preferred examples of the organic solvent include monohydric alcohols such as methanol, ethanol, isopropanol, butanol, etc.; polyhydric alcohols such as ethylene glycol; cellosolves such as methyl cellosolve, ethyl cellosolve, etc.; cyclic ethers such as tetrahydrofuran, dioxane, etc.; aromatic hydrocarbons such as benzene, toluene, xylene, etc.; phenols such as phenol, resorcin, etc.; alicyclic hydrocarbons such as cyclohexane, decalin, etc.; ketones such as acetone, butanone-2, cyclohexanone, etc.; esters such as ethyl acetate, diethyl malonate, ethylene glycol diacetate, diethyl carbonate, etc.; halogenoalkanes such as chloroform; fluoroalcohols such as fluoroisopropyl alcohol; sulfoxides such as dimethylsulfoxide; carboxylic acid N,N-dialkylamides such as N,N-dimethylformamide, N,N-dimethylacetamide, etc.; and the like.

The present invention will now be explained in more detail by reference to examples of preferred embodiments of the present invention which, however, are not to be construed as limiting the present invention in any way.

EXAMPLE 1

Figure 2:
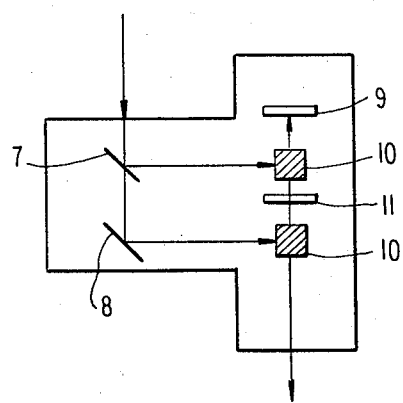
FIG. 2 is a detailed view showing the dye laser in FIG. 1, wherein numeral 7 designates a beam splitter for oscillator, 8 a totally reflecting mirror for amplifier, 9 a diffraction grating, 10 a dye cell, and 11 an output mirror.

A dye represented by the formula:

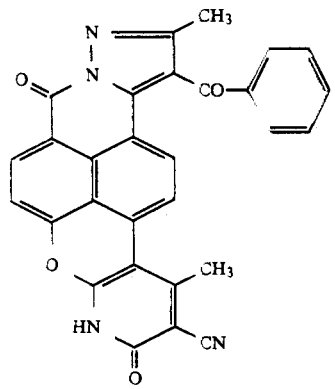

was dissolved in N,N-dimethylformamide in a concentration of $6.0 \times 10^{-4}$ mol/l, and the resulting solution was placed in a quartz cell. Laser activity of this dye was measured by means of a device shown in FIGS. 1 and 2 using an Nd-YAG laser as a pumping light source.

The measurement was conducted using a pumping laser beam of 532 nm (second harmonic of 1.06 μm) generated by an Nd-YAG laser to obtain an oscillation wavelength region of 588 to 609 nm (maximum oscillation wavelength: 599 nm), a pulse width of 10 n sec, an output power of 2.7 mJ, and an efficiency of 14%.

EXAMPLE 2

A dye represented by the formula:

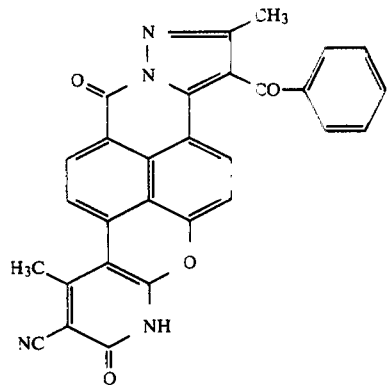

was dissolved in N,N-dimethylformamide in a concentration of $1.2 \times 10^{-3}$ mol/l, and the resulting solution was placed in a quartz cell. Laser activity of this dye was measured by means of a device shown in FIGS. 1 and 2 using an Nd-YAG laser as a pumping light source.

The measurement was conducted using a pumping laser beam of 532 nm (second harmonic of 1.06 μm) generated by an Nd-YAG laser to obtain an oscillation wavelength region of 614 to 660 nm (maximum oscillation wavelength: 637 nm), an output power of 4.2 mJ, and an efficiency of 19%.

EXAMPLE 3

A dye represented by the formula:

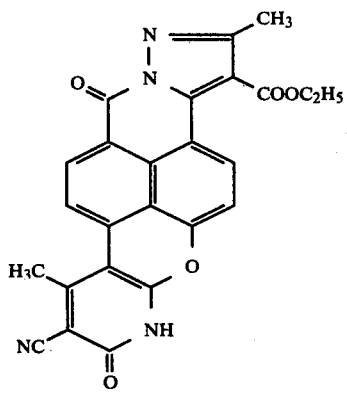

was dissolved in N,N-dimethylformamide in a concentration of $4.0 \times 10^{-5}$ mol/l, and the resulting solution was placed in a quartz cell. Laser activity of this dye was measured by means of a device shown in FIGS. 1 and 2 using an Nd-YAG laser as a pumping light source.

The measurement was conducted using a pumping laser beam of 532 nm (second harmonic of 1.06 μm) emitted by an Nd-YAG laser to obtain an oscillation wavelength region of 600 to 619 nm (maximum oscillation wavelength: 610 nm), an output power of 0.24 mJ, and an efficiency of 1.4%.

EXAMPLES 4 TO 19

Oscillation wavelengths were measured in the same manner as in Example 1 except using solutions prepared by dissolving the dyes shown in Table 1 in concentrations also shown in Table 1. The results obtained are shown in Table 1.

EXAMPLES 20 TO 28

Oscillation wavelengths were measured in the same manner as in Example 1 except using solutions prepared by dissolving the dyes shown in Table 2 in concentrations also shown in Table 2. The results obtained are shown in Table 2.

TABLE 1

| Example | —$R^1$ | —$R^2$ | —$R^3$ | Solvent | Concentration (mmol/l) | Maximum Oscillation Wavelength (nm) |
|---|---|---|---|---|---|---|
| 4 | —$CH_3$ | —$COOCH_3$ | —$CH_3$ | N,N—dimethylformamide | 1.3 | 609 |
| 5 | " | —$COOC_4H_9(i)$ | " | " | 1.2 | 613 |
| 6 | " | —COO—⟨C₆H₁₁⟩ | " | dimethylsulfoxide | 0.8 | 606 |
| 7 | " | —COOCH₂—⟨tetrahydrofuryl⟩ | " | N,N—dimethylformamide | 3.8 | 614 |
| 8 | " | —$CONH_2$ | " | dimethylsulfoxide | 1.8 | 611 |
| 9 | " | —$CON(C_2H_5)_2$ | —$C_3H_7(n)$ | " | 2.4 | 621 |
| 10 | " | —CON⟨morpholino⟩ | —$CH_3$ | " | 4.3 | 623 |

TABLE 1-continued

[Structure: pyrazole-naphthalene-pyridinone compound with R¹, R², R³ substituents]

| Example | -R¹ | -R² | -R³ | Solvent | Concentration (mmol/l) | Maximum Oscillation Wavelength (nm) |
|---|---|---|---|---|---|---|
| 11 | " | -COO-C₆H₅ | " | N,N-diemethylformamide | 1.1 | 610 |
| 12 | -H | -COOC₂H₅ | " | " | 1.4 | 606 |
| 13 | -CH₂COOCH₃ | -COOCH₃ | " | " | 0.9 | 612 |
| 14 | -C₆H₅ | -CN | " | dimethylsulfoxide | 1.3 | 608 |
| 15 | " | -CO-C₆H₅ | " | N,N-dimethylformamide | 1.09 | 635 |
| 16 | " | " | -C₄H₉(i) | " | 1.7 | 639 |
| 17 | -CF₃ | -COCH₃ | " | " | 1.4 | 641 |
| 18 | " | -CO-(2-thienyl) | -CH₃ | " | 1.1 | 639 |
| 19 | -CH₂-C₆H₅ | -COOC₂H₅ | -C₂H₅ | " | 1.3 | 612 |

TABLE 2

[Structure: isomeric pyrazole-naphthalene-pyridinone compound with R¹, R², R³ substituents]

| Example | -R¹ | -R² | -R³ | Solvent | Concentration (mmol/l) | Maximum Oscillation Wavelength (nm) |
|---|---|---|---|---|---|---|
| 20 | -COOC₂H₅ | -COOC₂H₅ | -CH₃ | tetrahydrofuran | 0.05 | 573 |
| 21 | -CH₃ | -COCH₃ | " | dimethylsulfoxide | 1.1 | 538 |
| 22 | " | -COOC₃H₇(n) | " | " | 1.2 | 561 |
| 23 | " | -COOC₆H₁₃(n) | " | " | 1.4 | 565 |

TABLE 2-continued

| Example | —R¹ | —R² | —R³ | Solvent | Concentration (mmol/l) | Maximum Oscillation Wavelength (nm) |
|---|---|---|---|---|---|---|
| 24 | " | —CONH—C₆H₅ | " | " | 1.2 | 581 |
| 25 | " | —COOCH₂—C₆H₅ | " | N,N—dimethylformamide | 4.3 | 572 |
| 26 | " | —COOC₂H₄N(C₂H₅)₂ | " | " | 2.1 | 563 |
| 27 | —H | —CO—C₆H₅ | " | " | 1.6 | 563 |
| 28 | —C₆H₅ | —COOC₂H₅ | " | " | 2.1 | 586 |

While the invention has been described in detail and with reference to specific embodiments thereof, it will be apparent to one skilled in the art that various changes and modifications can be made therein without departing from the spirit and scope thereof.

What is claimed is:

1. A dye laser comprising (1) a container retaining a dye solution for laser and (2) an energy source for pumping connected to said container, said dye solution containing a pyrazoloazaxanthenoisoquinolinone dye represented by the formula:

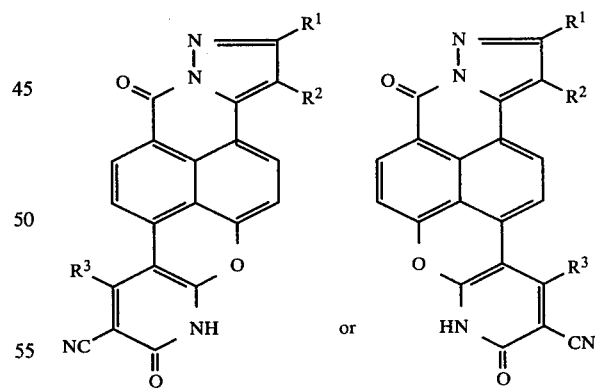

wherein $R^1$ represents a hydrogen atom, an alkyl group, a trifluoromethyl group, an alkoxycarbonyl group, an alkoxycarbonylalkyl group, an aralkyl group or a phenyl group, $R^2$ represents an optionally substituted alkoxycarbonyl group, a cyclohexyloxycarbonyl group, a tetrahydrofurfuryloxycarbonyl group, an aryloxycarbonyl group, a benzyloxycarbonyl group, an acyl group, a cyano group or an optionally substituted carbamoyl group, and $R^3$ represents a lower alkyl group.

* * * * *